Nov. 18, 1958  M. S. CLARK  2,860,893
BALL DETENT TYPE COUPLING WITH BREAK-AWAY FEATURE
Filed May 9, 1955  2 Sheets-Sheet 1

INVENTOR.
MALCOLM S. CLARK
BY

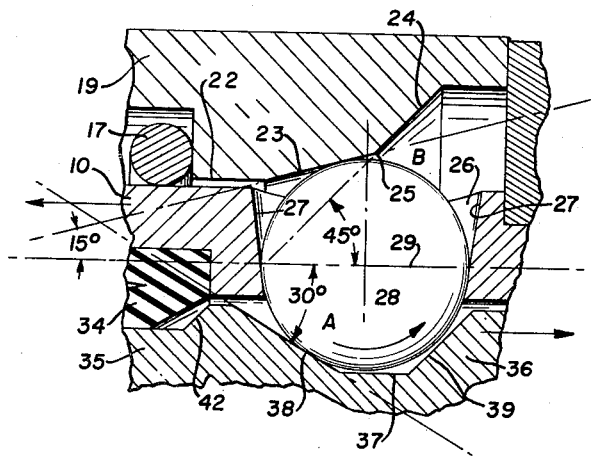
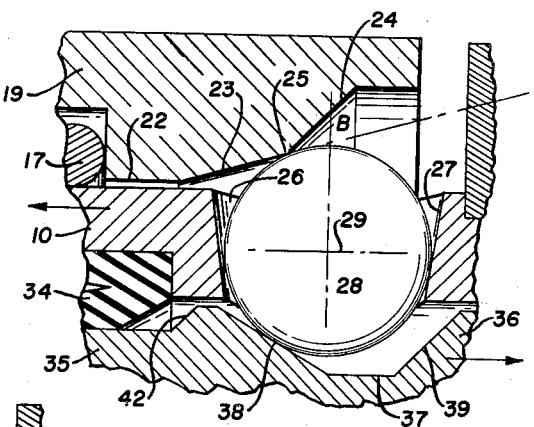
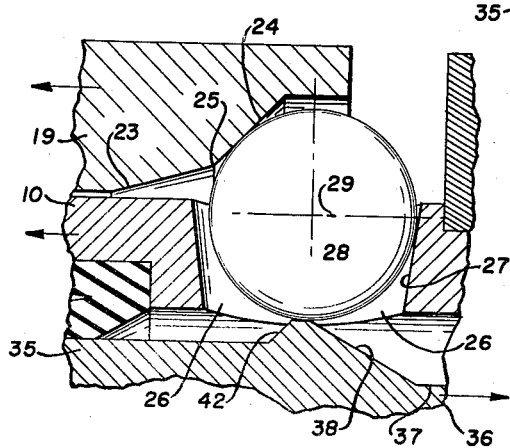

United States Patent Office 2,860,893
Patented Nov. 18, 1958

2,860,893

BALL DETENT TYPE COUPLING WITH BREAK-AWAY FEATURE

Malcolm S. Clark, Union City, Pa., assignor to Snap-Tite, Inc.

Application May 9, 1955, Serial No. 507,052

1 Claim. (Cl. 285—1)

This invention relates generally to couplings of the type including male and female units which are normally held coupled together by spring tension urging a locking sleeve against interlocking means to prevent separation of the units. In most prior couplings, the locking sleeve must be manually operated to allow separation of the units.

An important object of this invention is the provision of means whereby the tension of a preloaded spring can be overcome to automatically move the locking sleeve to an unlocked position by pulling the units apart with a force in excess of the fluid pressure handled by the coupling, in order to provide a break-away type of coupling which can be uncoupled without manual operation of the locking sleeve when the uncoupling forces exceed a predetermined degree. This break-away coupling is usually employed in flexible hosing used on tank vehicles to load and unload liquids and gaseous mediums where the operator is apt to neglect to manually disconnect the coupling and starts to drive the vehicle away with the hose connected to a stationary tank. With ordinary couplings which do not pull apart, such drive away will break the hose or other parts of the installation with obvious damage and dangers. With the use of the break-away coupling of this invention, in such a situation, the units of the coupling will be pulled apart without damage to the hose; and when valves are used in these units, they will automatically close upon separation of the units to prevent spillage and wastage.

Another important object is the provision of a coupling which employs a spring having a fixed predetermined manufactured loading to manually retain the locking sleeve in a locking condition to retain the units coupled and which locking sleeve is provided with primary and secondary camming surfaces cooperating with a camming surface of a male unit and related to the separating forces exercised upon the coupling in a manner to shift such forces from a radial direction to an axial direction to move the sleeve without direct manual operation thereof to an unlocked position to thereby permit uncoupling or break-away of the units when the separating forces approach a critical breakage stage.

Another object is the provision of critical release of angles of the camming surface of the female locking sleeve with an angle of a male locking groove surface which, under normal separation forces, will delay the pull-apart action of the coupling until there has been sufficient accumulation of separation forces to insure separation of the units at a time which is not premature.

Other objects and advantages of the invention will become apparent during the course of the following description. In the accompanying drawings forming a part of the description and wherein like numerals are employed to designate like parts throughout the several views:

Figure 2 is an enlarged vertical section taken through the interlocking means of the coupling shown in a locked or coupled position;

Figure 3 is a similar view showing the approximate relative positions of the parts of the coupling just before the coupling parts break-away to an uncoupled condition; and Figure 4 is a similar view illustrating the approximate positions of the parts with the interlocking means unlocked and the units in position to be entirely separated.

Figure 1:
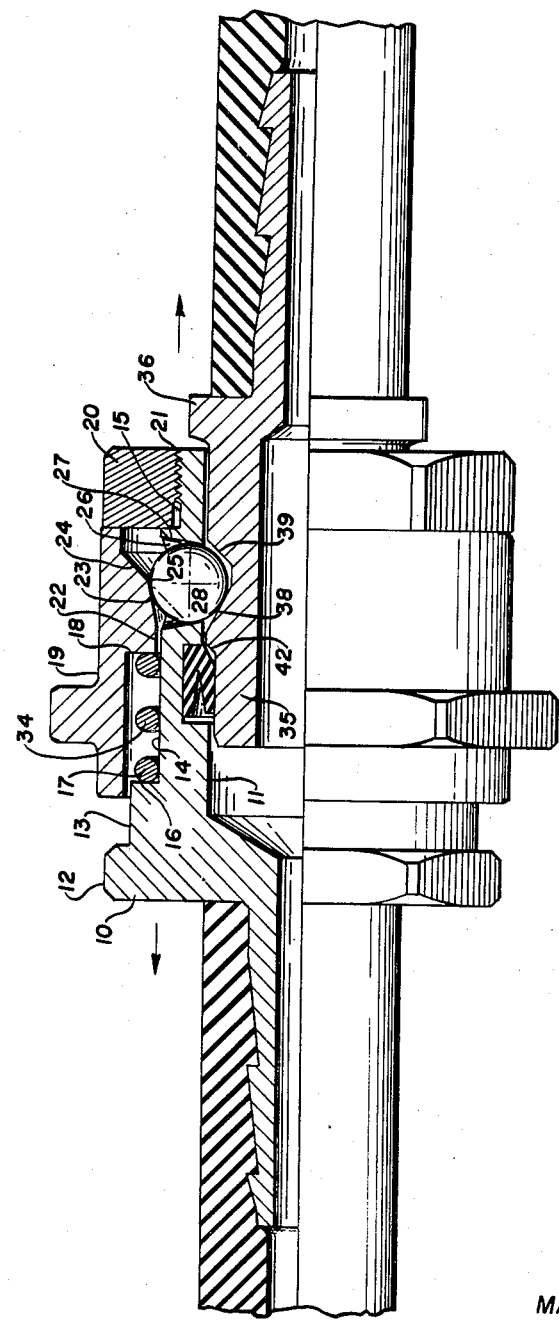
Figure 1 is a side elevation of the two units of the coupling in coupled or connected positions and with the upper half of the coupling shown in longitudinal section.

Referring now more particularly to the drawings, the numeral 10 designates a female unit of the coupling having a central axial bore 11 therethrough, and its exterior surface provided with four different diameters 12, 13, 14 and 15. The difference in diameter between the surfaces 13 and 14 forms an annular shoulder 16 for the abutment of one end of a cylindrical compression spring 17, which, in manufacture, is preloaded to have a fixed compression strength. The other end of this spring abuts an internal shoulder 18 of a locking sleeve 19 mounted for sliding movement lengthwise or axially on the surfaces 13 and 14. The movement of this locking sleeve in a locking direction is stopped by the outer end of the sleeve abutting an adjustable stop collar 20 threadedly connected as at 21 with the surface 15.

To cooperate with interlocking means, the interior surface of the sleeve is provided with a straight axial bore portion 22, a primary tapered surface or bore portion 23 and a secondary tapered surface or bore portion 24. The primary tapeed surface is tapered at an angle of about fifteen degrees relative to the axis of the coupling, while the secondary tapered surface 24 is tapered at an angle of approximately forty-five degrees relative to this axis so that they intersect or meet at a point 25 which will be termed herein as a break-away point. This juncture 25, when the locking sleeve is in the locked position, is located axially just a slight distance to the right of a transverse plane extending through the centers of a plurality of radial ball sockets 26. These sockets extend transversely through the wall of the female unit to open at their inner ends into the bore 11 and also to open out through the cylindrical surface 14. The walls 27 of each socket 26 flare outwardly at an angle of approximately eighty-two degrees relative to the axis of the coupling. A locking ball 28 is positioned in each socket; and when in the locked position as shown in Figure 2, a horizontal line 29 drawn through the center of the ball intersects the lower or inner region of its respective socket, with the inner portions of the balls 28 projecting into the bore 11 and the outer portions of the balls engaging the primary tapered surface 23 near the break-away point 25. Just inwardly of the ball sockets, the bore 11 is provided with a groove to receive a rubber-like sealing ring 34 to sealingly engage with a nipple portion 35 of a male coupling unit 36.

The nipple portion of the male unit is provided with an annular locking groove 37 which has side walls 38 and 39 tapered and diverging toward the circumference of the male unit. The side wall 39 of this locking groove most remote from the free end of the nipple makes an angle of about forty-five degrees relative to the axis thereof, while the other tapered wall 38 makes an angle of approximately thirty degrees with this axis.

When the units of the coupling are coupled and interlocked by the balls 28 projecting into the locking groove 37, it will be observed that the tapered walls 23 and 38 diverge toward the socket end of the female member and form, in effect, a ball locking chamber "A" to form a pair of walls between which the balls are confined when the units are coupled. It will also be observed that the opposing tapered walls 24 and 26 diverge toward the center of the ball and constitute a flaring mouth of a ball release chamber "B". Thus, with the balls interlocking the two units together as shown in Figures 1 and 2, the ball release chamber "B" has a mouth too small to receive the balls for releasing the units to separating movement.

Such separating movement of the two coupling units is indicated by the directional arrows and exerts radial components upon the locking balls 28 to force them into engagement with the smaller angled primary surface 23 of the locking sleeve. While the major portion of this component is exercised radially upon the wall 23, it also exerts a slight axial component on the surface 23 which tends to move the locking sleeve only slightly axially against the tension of the spring 17 just sufficient to allow the balls to approach the break-away point 25, but not sufficiently to permit the balls to move outwardly beyond this point unless much greater separating forces are applied to the coupling in the direction of the arrows.

During the first stage of unit separation, which is but slight, the tapered wall 38 of the male unit has moved the balls 28 against and radially upward on the tapered socket walls 27, which action shifts the locking sleeve only slightly to the left of the figures to slightly enlarge the mouth of the ball release chamber "B," so that upon exertion of greatly increased unit separation forces, the balls 28 will pass over the break-away point 25 and the pressure exercised upon the balls by the wall 38 will further elevate the balls in their sockets and reflect the force component from the socket wall 27 in a more axially direction against the secondary tapered surface 24 to thereby move the locking sleeve 19 to the left as shown in Figure 4, where the balls will then be disposed substantially in the ball release chamber and be removed from the locking groove 37 of the male nipple to permit a sudden break-away or separation of the coupling units without direct manual and separate manipulation of the locking sleeve 19. It will be observed that in this arrangement, the spring 17 is manufactured with a predetermined fixed loading so that it can be assembled in the unit without requiring adjustments of other parts to properly correlate it with the cam angle on the locking sleeve.

It will also be observed that the male nipple is provided with a bevel or tapered surface 42 in front of the locking groove 37 and toward the free end of the nipple so that when the two units are to be coupled, the male nipple is forced into the female bore 11, thereby causing the tapered surface 42 to engage the portions of the balls projecting into the bore to act thereon in forcing the balls radially outwardly from the ball locking chamber "A" into the ball release chamber "B" in the same manner that they are forced outwardly when separating forces are exerted on the units and without separate and direct manual manipulation of the locking sleeve 19. During coupling of the units and as the male nipple 35 moves deeper into the bore 11, the spring 17 acting through the tapered surfaces 24 and 23 will urge the balls radially inwardly until the locking groove 37 of the male member registers therewith and allows the balls to project to their full locking extent to hold the units coupled. Thus, the units of the coupling may be connected and disconnected by merely forcing them axially and relatively without a separate direct manual manipulation of the locking sleeve.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A break-away coupling comprising male and female units, said female unit having a bore for the reception of a male unit having an annular locking groove with outwardly flared side walls, said female unit having a series of circumferentially spaced sockets with outwardly flared side walls, locking balls in said sockets normally projecting into said bore and into said locking groove when said male unit is inserted into said bore to lock said units in coupled condition, a locking sleeve slidable longitudinally on said female unit and having a primary inclined surface arranged in opposition to and diverging from one of said flared side walls of said locking groove at an angle of about fifteen degrees to the coupling axis and defining with said flared side wall a ball locking chamber having diverging walls with an included angle of approximately forty-five degrees, a spring having a fixed preloading to bias said sleeve to a locked position where said primary surface engages said balls to hold them in said locking chamber, said sleeve having a secondary surface diverging in the same direction as said primary surface at a greater angle of about forty-five degrees to the coupling axis to define a break-away angle and a ball release chamber, said secondary surface forming with a side wall of said socket a restricted mouth into said ball release chamber, said units when separating forces are exerted thereon being relatively slightly movable axially to cause said balls to engage said primary surface and move said sleeve axially against the tension of said spring only to such degree as will position said balls nearer to said break-away angle while still preventing separation of said units but with said included angle sufficient to permit only slight further movement of said sleeve against the tension of said spring upon exertion of greater separating forces that will cause said spring to be further tensioned to allow said balls to pass over said break-away angle and into said mouth to cam against said secondary surface and move said sleeve further axially to an unlocking position to allow said balls to enter said ball release chamber and leave said locking groove to release said male unit from said female unit.

References Cited in the file of this patent

UNITED STATES PATENTS

| 1,119,276 | Griffith | Dec. 1, 1914 |
| 2,428,637 | Scheiwer | Oct. 7, 1947 |
| 2,434,426 | Muller | Jan. 13, 1948 |
| 2,461,705 | Stranberg | Feb. 15, 1949 |
| 2,536,702 | Scheiwer | Jan. 2, 1951 |
| 2,642,297 | Hanna | June 16, 1953 |
| 2,750,209 | Robb | June 12, 1956 |